Jan. 17, 1939. J. BAILEY 2,144,320
MEANS FOR THERMALLY TOUGHENING GLASS
Filed Feb. 25, 1936
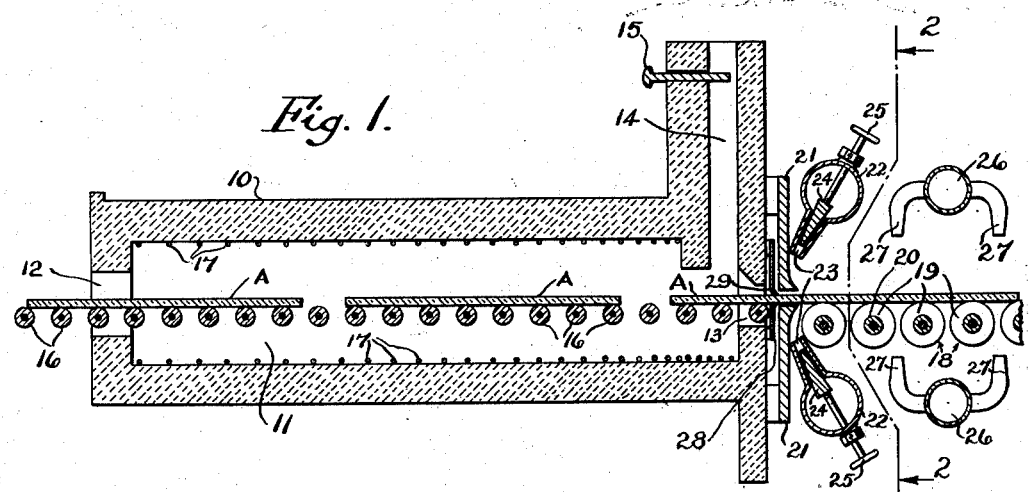
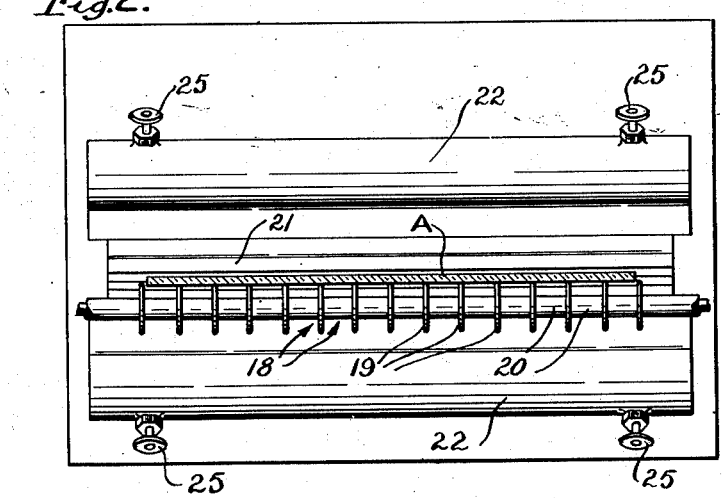
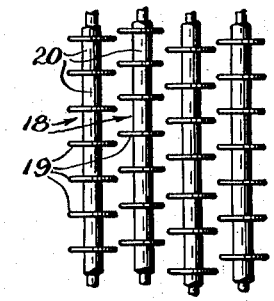
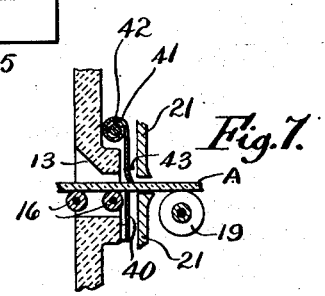
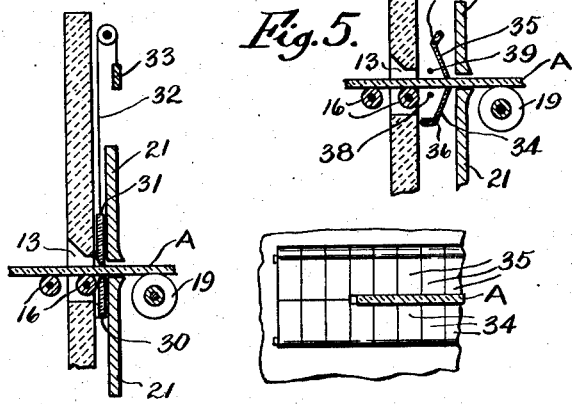
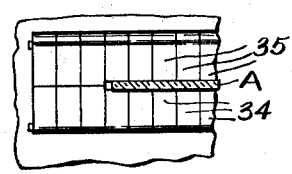
INVENTOR
James Bailey
Parker, Prochnow & Farmer
ATTORNEYS Patented Jan. 17, 1939

2,144,320

UNITED STATES PATENT OFFICE 2,144,320

MEANS FOR THERMALLY TOUGHENING GLASS

James Bailey, Hamburg, N. Y., assignor to Bailey & Sharp Co., Inc., Hamburg, N. Y.

Application February 25, 1936, Serial No. 65,655

2 Claims. (Cl. 49—45)

This invention relates to an improved method and apparatus for heating and treating sheet glass and relatively flat glass articles, and particularly to thermally toughening the glass.

The method of thermally toughening glass by first heating it to a temperature at which it is somewhat plastic and then suddenly chilling the surface is old in the art. The procedure commonly used is to first heat the entire glass article to a sufficiently high temperature, said temperature being substantially uniform throughout the glass body. The glass article is then quickly removed from the hot zone and suddenly chilled either by dumping it into a tank of warmed oil or by rapidly cooling the surface with blasts of cool air. In either of these methods, the chilling is done as rapidly and as uniformly as possible over the entire surface of the glass, except that certain precautions are sometimes taken to prevent over-chilling of the edges.

The system which I employ and which is the subject of this invention differs from the foregoing in that it applies to sheet glass only or to glass articles which are much longer and broader than they are high and hence take the form of sheets. Thus all forms of ribbed and corrugated sheet glass and shallow trays are subject to treatment by my method and in my apparatus, while tumblers, bottles and jars would be excluded.

An object of the invention is to provide an improved and continuous method for thermally toughening glass.

Another object of the invention is to provide an improved method of thermally toughening glass, which may be easily practiced after the glass has been cut to the desired size, with which the handling of the glass during treatment will be simplified, with which the loss through breakage and other defects will be reduced to a minimum, and which will be relatively rapid, simple and inexpensive.

Another object of the invention is to provide an improved apparatus for thermally toughening glass, with which the glass in slabs, sheets or relatively flat articles of different sizes may be efficiently and continuously treated and toughened with a minimum of deformity in the treated slabs or articles, which will be relatively compact, simple and inexpensive, so as to be available at a low cost to dealers in flat glassware, which will be exceptionally efficient, which will require a minimum of labor for operation, and which will produce dependable and uniform results.

Various other objects and advantages will be apparent from the following description of several embodiments and examples of the invention, and the novel features will be particularly pointed out hereinafter in connection with the appended claims.

In the accompanying drawing:

Fig. 1 is a sectional elevation, somewhat diagrammatically, of an apparatus constructed in accordance with this invention and illustrating one embodiment or example thereof;

Fig. 2 is a sectional elevation of the same, the section being taken approximately along the line 2—2 of Fig. 1;

Fig. 3 is a plan of a portion of the rollers for supporting the plastic glass during the sudden cooling operation and conveying it away from the lehr;

Fig. 4 is a sectional elevation of the exit end of a lehr, and illustrating a slight modification of the same, particularly as to the means for keeping the exit opening approximately closed except while glass slabs or articles are being discharged;

Fig. 5 is a similar sectional elevation of the exit end of the lehr, but illustrating a still further modification of the curtain means for normally closing the exit opening;

Fig. 6 is a transverse sectional elevation of the same; and

Fig. 7 is a sectional elevation of the discharge end of a lehr, and illustrating still another embodiment of the curtain or means that normally closes the exit opening of the lehr.

In the embodiment of the invention illustrated particularly in Figs. 1 to 3, the lehr 10 is provided with an oven or heating chamber 11, an entrance opening 12 at one end thereof and an exit opening 13 at the opposite end thereof. A stack 14 having therein an adjustable controlling damper 15 of any suitable construction extends upwardly from the heating chamber 11 at a point as close as possible to the exit opening 13. A plurality of cylindrical rollers 16 which are slowly rotated in the same direction about their axes by a suitable driving mechanism, not shown, are arranged across the interior of the oven or heating chamber 11 and for a short distance in front of the lehr, so as to receive slabs or article A of glass to be treated and convey them progressively though the lehr from entrance opening 12 to exit opening 13.

The rollers 16 are spaced apart so that the slabs or articles conveyed by the rollers will be exposed on both faces during their travel through the lehr. As illustrated in Fig. 1, the glass slabs A are conveyed progressively and continuously at an approximately uniform speed, in an edgewise direction through the chamber 11 and are discharged through the exit opening 13. These rollers 16 are preferably relatively small in diameter, and are so located that their top surfaces lie in a common plane.

The oven or heating chamber 11 is heated in any suitable manner, but preferably in zones of progressively increasing temperature from the entrance opening 12 toward the exit opening 13. For example, electrical resistance heaters or units 17 are arranged along the top and bottom walls of the oven or chamber 11. The temperatures, to which the slabs A are progressively exposed in their travel through the lehr, are preferably of increasing intensity toward the exit opening 13 for the reason that the slabs of glass entering the lehr may break if suddenly subjected to too intense a heat. This variation in temperature may be obtained by controlling or regulating the current in the heating units, or by varying the spacing of the units. In the illustrated embodiment of the invention this variation in intensity is obtained by suitable variation in the spacing of the resistance heating units 17, such units being spaced progressively closer together towards the exit end 13 of the oven or chamber 11.

With such a spacing of the heating units 17 both above and below the travelling slabs of glass, zones of progressively increasing temperature in oven 11 will be established, each of said zones extending at right angles to the direction of movement of the slabs. With such an arrangement the initial heat at the entrance end of the chamber 11 is not great enough to rupture, crack or shatter the entering glass, but with selection of proper speed of travel of the slabs of glass and with the temperature increasing towards the exit end, the temperature of the articles or slabs will be gradually and progressively increased until the slabs of glass are slightly plastic as they reach the exit end of the chamber.

Each sheet or slab of glass undergoing treatment will remain substantially flat, even though it is slightly plastic, owing to the multiple and changing support of the rollers. The damper 15 is so regulated that there is a slight movement of the air through the oven or chamber 11 towards the stack, which aids in maintaining the difference in the temperature zones in the chamber 11 without the necessity of partitions, and it prevents the entrance of any substantial quantity of cold air into the heating chamber at either end. If any cold air should enter the oven through the exit opening 13, it will immediately pass up the stack before having any substantial effect on the slab, and if cold air enters through opening 12, it does not materially affect the glass because the glass is only being initially heated at that end of the oven. Arranged in a row exteriorly of the lehr, and beginning adjacent to the exit opening 13, is another series of rollers 18 which are also slowly driven in the same direction from any suitable source of power, so as to receive slabs or articles of glass from the exit opening 13 of the lehr as delivered through that opening by the rollers 16.

The upper surfaces of the rollers 18 are in a common plane which is a continuation of the plane of the upper surfaces of the rollers 16. The rollers 18, instead of being cylindrical like the rollers 16, are preferably made up of a series of comparatively thin disks 19 of relatively large diameter, separated by thick spacers 20 of smaller diameter, as shown particularly in Fig. 3. The large diameter disks preferably have rounded or somewhat V-shaped peripheral edges which provide substantial line contact with the slabs or articles and thus permit free circulation of air next to the under face of the glass, so as to offer little interference with the cooling of the under face of the slab leaving the lehr. I also prefer to displace the disks laterally on each succeeding roller, progressing in the direction of travel of the slab, in such a manner that no two of the disks have a common line of contact on the moving glass while the glass is in the chilling zone, as shown particularly in Fig. 3.

Partitions 21 are disposed above and below the path of the slabs, closely adjacent to the exit opening 13. Headers 22 are disposed above and below the travelling glass slabs leaving the lehr and supply blasts of cooling air, preferably at a relatively high velocity, simultaneously to the upper and lower faces of the slightly plastic glass slabs leaving the exit opening 13. These headers deliver the cooling air through orifices 23, which are preferably slot-like and are directed at an inclination to the outer faces of the partitions 21 and also to the faces of the slabs leaving the lehr, as shown particularly in Fig. 1. In other words, the nozzles or orifices 23 deliver the blasts of air directly towards the exit opening 13 except that such blasts are deflected toward the slab by the partions 21. The slot-like orifices discharge sheet-like, well-defined currents of air.

In order to avoid any danger of such cooling air entering the lehr through the exit opening 13 to any appreciable extent, the edges of the partitions 21 which run along the faces of the slabs leaving the exit openings, at their outer faces are curved or flanged in the direction of travel of the slabs, so as to form toes that deflect the air striking the slabs on opposite faces thereof, somewhat in the direction of travel of the slabs and thus very little, if any, of the cooling air will pass along the faces of the slabs in a direction to enter the lehr through the exit opening 13. Instead, the currents of air delivered by the nozzles 23 will cover the entire faces of the slabs and travel in the direction of travel of the slabs, so as to produce an abrupt, sudden and intense chilling effect upon the opposite faces of the slabs which leave the lehr in a slightly plastic condition. This tends to harden the surfaces of the slabs somewhat before they reach the rollers 18, and therefore, the latter will not materially mark the slabs being conveyed thereby. The volume of cooling air delivered by the nozzles 23 may be controlled by suitable valves 24 which are adjusted by screws 25, Figs. 1 and 2.

Additional headers 26 are also arranged above and below the rollers 18, somewhat further away from the lehr, and these headers deliver cooling air, preferably at relatively lower velocities, through nozzles 27 against the upper and lower faces of the slabs carried by the rollers 18, so as to continue the cooling of the slabs until they have approximately reached normal room temperatures. Any number of such headers 26 may be arranged along the path of travel of the slabs, as may be required.

In order to decrease further the possibility of leakage of cold air along the opposite faces of the slabs into the lehr through the exit opening 13, I may also provide curtains 28 and 29, arranged above and below the slabs and in contact with the slabs leaving the exit opening 13 between opening 13 and partitions 21, so as to substantially seal the opening 13, yet yield and allow the slabs to be discharged through the opening 13 upon the rollers 18. In the embodiment of the invention shown in Fig. 1, these curtains 28 and 29 are preferably strips or sheets of flexible, heat resisting material, such as flexible asbestos sheets or flexible metal strips or sheets, supported so as to normally abut one another along adjacent edges and close the opening 13, but flexible so that slabs leaving the exit opening 13 may flex the free adjacent edges of the curtains laterally and pass by, as shown in Fig. 1. The strips forming the curtains may be so narrow as to act somewhat like a brush in that the glass slabs easily push only groups of the strips apart in passing. The curtains 28 and 29 thus provide an auxiliary seal for opening 13, and the adjacent edges of the curtains may normally contact one another approximately in the center line of the glass sheets or slabs leaving the exit opening 13.

It will be understood that the length of the oven or chamber 11 and the speed of the rollers 16 and 18 must be such as to permit a gradual heating up of the slabs or sheets of glass, without danger of their cracking or breakage, from approximately room temperatures at the entrance opening 12 of the oven, and yet insure that the slabs are throughout their thickness, uniformly in a slightly plastic condition as they reach the exit opening 13. The rate of travel of the slabs on the rollers 16 and 18 may be adjusted, upon variations of the thickness of the slabs or sheets, because the greater the thickness of the slabs, the slower should be the travel of the slabs, to insure that the slabs or sheets of glass will be heated uniformly throughout their thickness to the slightly plastic condition as they reach the exit opening 13. The capacity of the unit may be increased by speeding up the travel of the sheets through the oven, but in this event, the length of the oven and of the chilling zones must be increased in proportion thereto, so that the same relative heat treatment will be maintained. With higher speeds of travel, additional air discharge devices may be required in order to increase the length of the cooling zones. Some variation in the heating elements 17 or current supplied thereto, may also be made to speed up the process, but the heating cannot be too rapid without danger of cracking the glass slabs.

In Fig. 4, a slight modification of the curtains for closing the exit opening 13 is illustrated. In this embodiment of the invention, the curtains 28 and 29 are replaced by a relatively fixed plate 30 supported in a relatively fixed position below the common plane tangent to the upper surfaces of the rollers 16, and with the upper edge of this plate 30 only very slightly below that plane. This plate 30 is bevelled off along its inner face at its upper edge, so that if the forward edge portions of the slightly plastic sheets or slabs of glass should sag or bend slightly downwardly as they leave the last roller 16 in the exist opening 13, they would be cammed upwardly and directed to the space between the partitions 21. A movable curtain 31 in the nature of a relatively stiff plate extends above and across the slabs of glass leaving the exit opening 13, and this plate 31, which also is preferably of heat resisting material, is mounted for vertical sliding movement. The plate 30 is preferably partly counterbalanced by suitable means, such as cables 32 and counter weights 33, so that it will have only a very slightly downward bias or urge, but which is sufficiently normal to carry it downwardly against the upper edge of the fixed lower plate 30. The inner face of the plate 31, at its lower edge, is bevelled so that when the forward edges of the slabs of glass leaving the exit opening 13 engage it, it will be cammed upwardly thereby, then will ride lightly upon the upper surface of such sheets or slabs of glass, and then descend to closed position in contact with the upper edge of the lower plate 30 as soon as the sheets or slabs of glass have passed.

In Figs. 5 and 6, a still further modification of the curtain is illustrated. In this embodiment of the invention, the curtains are replaced by a series of hinged plates 34 and 35, which are pivoted respectively on common pins 36 and 37, and act somewhat like a plurality of hinged dampers arranged side by side above and below the slabs. The plates 34 are over-balanced, so as to be yieldingly but continuously urged into vertical positions in which the upper, free edges of the plates are in the path of the sheets or slabs of glass leaving the exit opening 13, movement beyond each position in a direction toward the exit opening 13 being limited by a stop pin or rod 38. Similarly the plates 35 are urged or biased by weights so as to swing downwardly into the paths of travel of the sheets or slabs of glass leaving the exit opening 13, such movement being limited by a stop rod 39. When the plates 34 and 35 are swung by their weighted portions until they strike the rods 38 and 39, the adjacent free edges of the plates 34 and 35 will be in approximate contact with one another so as to prevent the travel of cold air from the nozzles 23 through the exit opening 13 into the oven. When a sheet or slab of glass leaves the exit opening 13, its forward edge will engage and cam apart the plates 34 and 35 with which it engages, as shown in Figs. 5 and 6, and then after the slab or sheet has passed, the plates 34 and 35 will drop back into their substantially engaging positions to prevent the passage of cold air from the nozzles 23 into the oven or chamber 11. Since the sheets or slabs of glass may vary in width, the plates 34 and 35 are freely and separately swingable on their pivots, so that only those plates which are engaged by a slab or sheet of glass at any time will be cammed outwardly and the others will remain in closed positions to prevent the passage of cold air through the exit opening 13 into the oven or chamber 11, as shown clearly in Fig. 6.

In Fig. 7, still another modification of the curtain is illustrated, in which a relatively fixed lower plate 40 is employed which is similar to plates 28 or 30. A curtain 41 disposed above the slabs of glass passing through the exit opening 13, is somewhat flexible and wound partially upon a roller 42 at its upper end, so that by rotating the roller 42, the curtain may be lowered or raised. The lower edge of the curtain 41 flexes outwardly when engaged by an emerging slab or sheet of glass as shown in Fig. 7, the outward swinging of the entire curtain may be prevented by a stop rod 43 disposed a short distance above the lower edge of the curtain as also shown in Fig. 7.

It will be noted that these auxiliary curtains which restrict the entrance of cold air through the exit openings 13 into the oven or chamber 11, automatically accommodate slabs or sheets of glass of different thicknesses. Various other modifications in said curtains may, of course, be made.

In the practice of this method and the operation of the illustrated apparatus, the slabs or sheets of glass of the desired final size, and either large or small, or both, are started into the oven or chamber 11 of the lehr 10, by being placed upon the rollers 16 adjacent to the entrance opening 12. Current is supplied to the heater units 17, and the damper 15 in the stack 14 is adjusted so that the movement of air through the chamber 11 from the entrance opening 12 is just enough to prevent the uniform distribution of heat throughout the chamber 11 and to establish definite zones of gradually increasing temperatures at different points of travel through the oven or chamber 11. The slabs or sheets of glass will thus be heated uniformly throughout their thickness, and progressively from their forward edges to their rear edges in their travel through the oven. As each portion of a slab leaves the exit opening 13, the temperature of that portion will have been raised throughout its whole thickness until it is slightly plastic. It will be observed that as the forward edge portion of a slab leaves the opening 13, it may be slightly plastic, yet the remainder of the slab which is approaching the opening 13 may not yet have fully reached the slightly plastic condition. This heating therefore proceeds progressively from edge to edge of the slab in its travel through the oven or chamber 11. As the slightly plastic slab portion emerges through the space between the partitions 21, it is struck upon both faces thereof simultaneously with a cooling fluid or currents of air from the nozzles 23 which produce a very sudden chilling of the surfaces of these slabs. These currents of cooling fluid or air are deflected along the slab in the direction of its travel, and maintain this cooling action on both faces of the slabs until such faces pass into the currents of cooling fluid or air, preferably at a lower velocity, delivered by the nozzles 27 also against both faces of the slab. This cooling action is continued until the slabs are cooled approximately to room temperatures, and it will be noted that since the cooling is abrupt and sudden as each slab emerges from the space or opening between the plates 21, this sudden cooling proceeds progressively and uniformly across the slab or sheet from edge to edge in the direction opposite to the travel of the slab. Such a treatment will produce a thermally toughened glass slab or article of high quality, and since the operation is continuous and progressive, the cost of such treatment is relatively small.

Inasmuch as it is impractical to cut slabs of such thermally toughened glass in the usual manner, such slabs are preferably first cut to the proper size and then passed through this improved treating apparatus, or otherwise treated in accordance with this improved method, in order to thermally toughen the same.

It will be understood that various changes in the details, materials and steps, which have been herein described and illustrated in order to explain the nature of the invention, may be made by those skilled in the art within the principle and scope of the invention, as expressed in the appended claims. It will also be understood that I consider glass articles which are longer and broader than their height, or which are relatively flat, such as shallow trays, for example, and all forms of ribbed and corrugated sheets or slabs of glass are subject to treatment in accordance with this invention and are intended to be referred to broadly as equivalents of sheets or slabs in the appended claims.

I claim as my invention:

1. In an apparatus for making thermally toughened glass, the combination of a lehr having entrance and exit openings at opposite ends thereof, means for conveying slabs of glass progressively and without stopping in an edgewise direction through said lehr from entrance opening to exit opening, means arranged at said exit opening for normally closing that opening and operable into open position by the slabs leaving the lehr through the exit opening, means in said lehr for heating the slabs to a temperature at which they are slightly plastic just before they leave the lehr, disk-like rollers arranged in rows running across the width of the slabs and disposed at intervals away from said exit opening for receiving slabs from said exit opening and conveying them away, without stopping and at the same speed, the disks of said rollers having peripheries convex in transverse section and being displaced laterally in the rows in a direction away from the exit opening, with each disk out of alignment with the other disks between it and the exit opening, means for directing sheet-like currents of relatively cool air against opposite faces of the slabs leaving the exit opening across their entire widths and at positions in close proximity to the exit opening, the sheet-like currents being directed slightly towards said exit opening, and deflecting means disposed at the exit opening of the lehr in the paths of said currents of air for deflecting the same along the faces of the slabs in a direction away from the exit opening.

2. Apparatus for making thermally toughened glass which comprises a lehr having an entrance opening at one end and a restricted exit opening at the other end, conveying means for conveying slabs of glass progressively without stopping through said lehr from entrance opening to exit opening, means for conveying the slabs from the exit opening at uniform speed away from that opening without interruption of travel, means for directing currents of cooling air toward said exit opening at opposite faces of each slab leaving that opening and substantially across the entire width of such slabs, deflecting means disposed on opposite faces of and close to such slab leaving said exit opening and close to said opening, within the path of travel of the jets of air, for deflecting said jets of air against opposite faces of said slabs close to said exit opening, in directions along the faces of the slabs and away from said exit opening, and means disposed further along the direction of travel of said slabs from said exit opening and directing further currents of cooling air against said slabs.

JAMES BAILEY.